United States Patent [19]

Ikawa

[11] 4,142,423
[45] Mar. 6, 1979

[54] SHOCK ABSORBING DEVICE

[75] Inventor: Kazuo Ikawa, Yokohama, Japan

[73] Assignee: Nissan Motor Company, Limited, Yokohama, Japan

[21] Appl. No.: 858,009

[22] Filed: Dec. 6, 1977

Related U.S. Application Data

[63] Continuation of Ser. No. 715,833, Aug. 19, 1976, abandoned.

[30] Foreign Application Priority Data

Aug. 20, 1975 [JP] Japan ................... 50-100219

[51] Int. Cl.² ............................................. B62D 1/18
[52] U.S. Cl. ........................................ 74/492; 188/1 C
[58] Field of Search ................. 74/492, 493; 188/1 C

[56] References Cited

U.S. PATENT DOCUMENTS

| 3,087,584 | 4/1963 | Jackson et al. | 188/1 C |
| 3,547,468 | 12/1970 | Giuffrida | 188/1 C |
| 3,699,824 | 10/1972 | Staudenmayer | 74/492 |
| 4,027,905 | 6/1977 | Shimogawa et al. | 188/1 C |

*Primary Examiner*—Allan D. Herrmann

[57] ABSTRACT

A strap of plastically deformable material is alternately passed over at least two rod members which are fixed to a relatively stationary portion. The stap is subjected to sucessive plastical deformations by pulling the strap from the rod members to damp a large force suddenly applied to the strap member.

2 Claims, 5 Drawing Figures

SHOCK ABSORBING DEVICE

This is a Continuation, of application Ser. No. 715,833, Filed Aug. 19, 1976, now abandoned.

The present invention relates to a shock absorbing device and particularly to an apparatus for damping large forces within a short distance and dissipating large amounts of kinetic energy within a short time. More specifically, the present invention is concerned with a shock absorbing device suitable for various parts or portions of a motor vehicle for minimizing damage on the vehicle due to collision, and thereby ensuring safety of the driver and or passengers of the vehicle.

In case of collision of the motor vehicle with an obstacle, there exists a great danger to the vehicle passengers by the impact force causing the driver to be thrown forwardly against the steering wheel and also causing the passengers against some interior parts of the vehicle. Thus, it is desirable to provide impact absorbing means to parts and/or portions of the vehicle so as to eliminate or at least mitigate such danger.

Up to now, there have been proposed a number of shock absorbing devices which are used for the various parts and portions of the motor vehicle, such as for a bumper mechanism, a seat belt system, a steering system, a knee protecting system and a head protecting system in an instrument panel.

However, each of these shock absorbing devices has not been widely used for the parts and/or portions of the vehicle by reason of their complicated constructions. More specifically speaking, one shock absorbing device which is designed to be suitable for an impact absorbing steering system is not used in a safety seat belt system. Each of these devices has been produced or manufactured so as to specifically suit the only one purpose thereof. This causes a high cost of the safety system.

Therefore, it is a main object of the present invention to provide an improved shock absorbing device which can be widely used in various kinds of safety systems of a motor vehicle.

It is another object of the present invention to provide a multi-purpose shock absorbing device which can be produced economically and is simple in construction.

It is still another object of the present invention to provide a safety seat belt system which has therein an improved shock absorbing device.

It is a further object of the present invention to provide an impact absorbing steering system equipped with an improved shock absorbing device.

It is a still further object of the present invention to provide a shock absorbing device which comprises a base member adapted to connect with a relatively stationary portion; a plurality of elongate members which are spaced from and arranged in parallel to each other, the elongate members being firmly supported by the base members; and a strap member having one end portion adapted to connect with a relatively movable member and the other end portion alternatively passing over the elongate members, the strap member being made of plastically deformable material; whereby when the strap member is driven away from the elongate members due to the outward movement of the relatively movable member with respect to the base member, a certain plastical deformation is successively occured in the strap member.

Other objects and advantages of the present invention will become more apparent from the following description when taken in conjunction with the accompanied drawings, in which.

Figure 1:
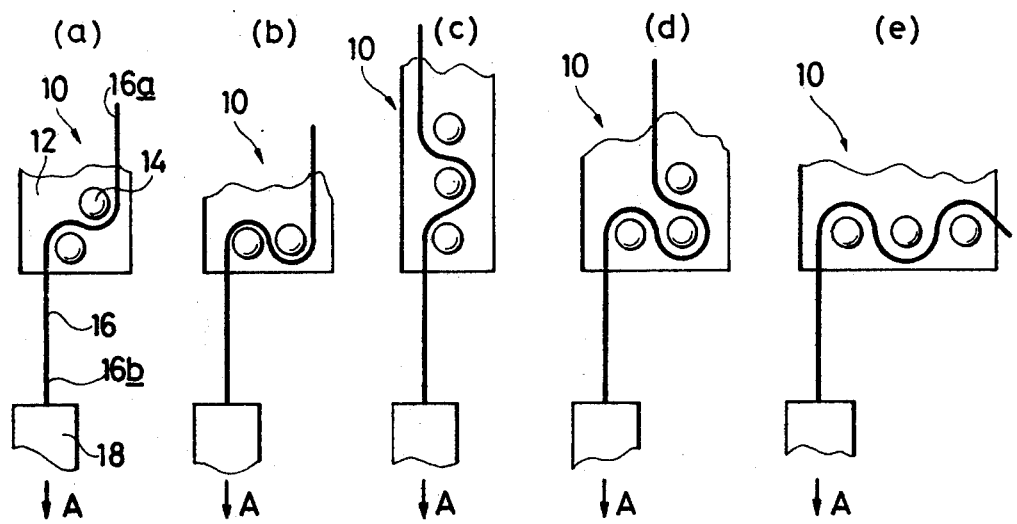
FIG. 1 shows several embodiments of a shock absorbing device according to the present invention, each schematically illustrating the novel concept of the present invention.

Referring now to FIG. 1 of the drawings, there are illustrated five variations a to e of a shock absorbing device 10 of the present invention. Each of the variations a to e generally comprises a first or base member 12 which is fixed to a relatively stationary member or portion, though not shown. At least two elongate or rod members 14 are firmly fixed to the base member 12 while being spaced apart from and in parallel to each other as shown. Alternately passing over the rod members 14 is a strap member 16 which is made of plastically deformable material. The strap member 16 has one end 16a loose and the other end 16b connected to a relatively movable member 18.

With the above-stated construction, the shock absorbing device 10 will operate as follows:

When an impact force is applied to the relatively movable member 18 from the direction indicated by the arrow A, the plastically deformable strap member 16 is driven away from the base member 12. During the movement, the strap member 16 will be successively plastically deformed at its contacting portions with the rod member 14. The successive plastical deformations of the strap member 16 will absorb or weaken the impact shock. In reality, an elastic deformation of the strap member 16 will occur and a frictional resistance will form between the contacting surfaces of the strap member 16 and the rod members 14 during the movement of the strap member 16. Fortunately, the elastic deformation and frictional resistance are useful, but at a low rate, for absorbing the shock.

As stated above, the shock absorbing device 10 has a very simple construction, thus, it is very easy to control the shock absorbing capability of it. In connection with the determination of the shock absorbing capability of the subject device 10, there exist following several parameters:

(1) cross sectional form of the rod member 14;
(2) cross sectional area of the rod member 14;
(3) number of the rod members 14;
(4) surface roughness of the rod member 14 and that of the strap member 16;
(5) thickness and width of the strap member 16;
(6) distance between the rod members 14;
(7) mutual arrangement of the rod members 14 and the strap member 16; and
(8) physical property of the strap member 16.

By choosing one or more of the parameters 1 to 8, various shock absorbing devices having various shock absorbing capabilities respectively will be readily made without employing any other specifically designated members.

Figure 2:
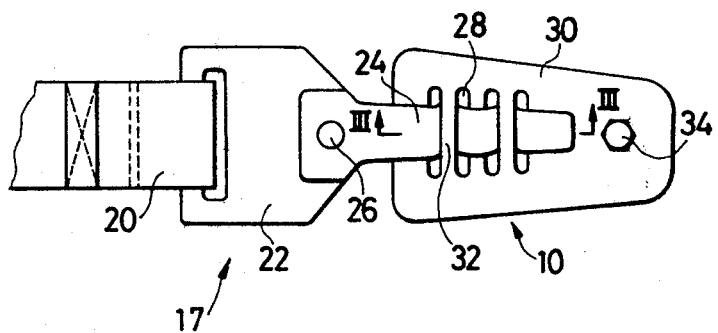
FIG. 2 is a schematically illustrated plan view of a safety seat belt system incorporating the shock absorbing device of the present invention.
Figure 3:
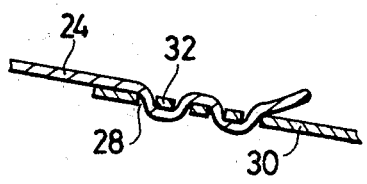
FIG. 3 is a sectional view taken along the line I—I of FIG. 2.

FIGS. 2 and 3 show an exemplary application of the subject shock absorbing device 10 to a safety seat belt system 17 of the motor vehicle. In this figure, one end of a seat belt proper and a D-ring fastened to the end of the seat belt are respectively designated by reference numerals 20 and 22. A strap 24 which is made of plastically deformable material and acts as the strap member 16 of FIG. 1 is connected at its one end to the D-ring 22 by means of a fastener 26. As well shown in FIG. 3, the strap 24 is alternately passed through parallel slots 28 formed in a base 30 which acts as the first or base member of FIG. 1. Bridges 32 located between the neighbouring two slots 28 act as the rod members 14 in the case of FIG. 1. The base 30 is tightly but swingably connected through a bolt 34 to a relatively stationary member such as the vehicle floor (not shown).

With this construction of the safety seat belt system 17, the impact shock applied to the seat belt proper 20 by a passenger, upon a vehicle collision is absorbed or at least weakened by the shock absorbing device 10.

Figure 4:
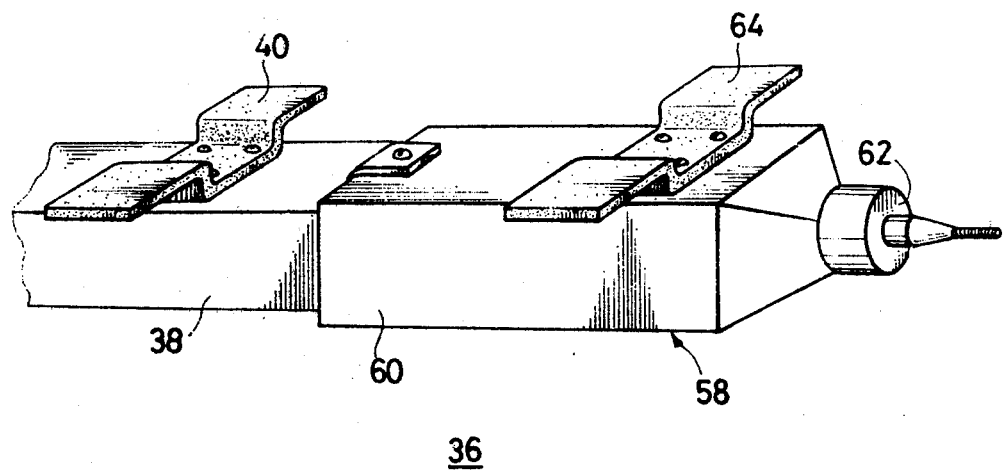
FIG. 4 is a schematically illustrated perspective view of an impact absorbing steering system incorporating the shock absorbing device of the present invention.
Figure 5:
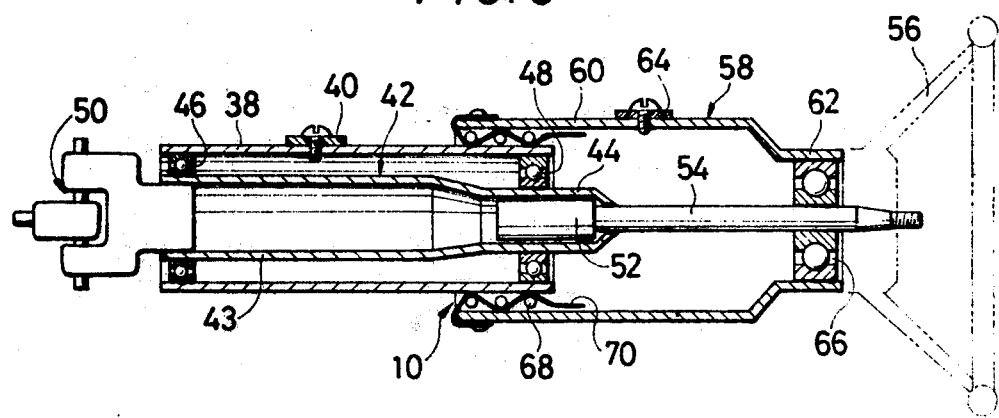
FIG. 5 is a sectional view taken along the line II—II of FIG. 4.

FIGS. 4 and 5 show another exemplary application of the subject shock absorbing device 10 to a safety steering system 36. The safety steering system 36 in which the subject shock absorbing device 10 is used comprises a hollow outer housing 38 which is firmly fixed to the vehicle body by means of a bracket 40. Telescopically received within the housing 38 is a tubular inner shaft 42 which consists of a large diameter portion 43 and a small diameter portion 44 as shown. First and second ball bearings 46 and 48 are engaged between the inner shaft 42 and the outer housing 38 at the large and small diameter portions 43 and 44 respectively, thus allowing the tubular inner shaft 42 to rotate with respect to the outer housing 38. Along the inner cylindrical surface of the small diameter portion is formed a suitable number of longitudinally extending grooves (not shown). The end of the large diameter portion 43 of the inner shaft 42 is suitably coupled through a steering linkage 50 to the front wheels (not shown) of the vehicle. Within the small diameter portion 44 of the inner shaft 42 is disposed an end or head portion 52 of a stub shaft 54 which is connected at its other end portion to a steering wheel 56 shown in phantom in FIG. 5, so that the vehicle may be steered by turning the steering wheel 56. The head portion 52 is formed at its cylindrical surface with a suitable number of longitudinally extending projections (not shown) which will be engaged with the grooves of the small diameter portion 44 of the inner shaft 42 for thus allowing the head portion 52 and accordingly the stub shaft 54 to longitudinally move with respect to the inner shaft 42. A box shaped cover 58 having a square cross section portion 60 and a cylindrical portion 62 is spacedly mounted around the stub shaft 54 so that the portion 60 covers the outside of the outer housing 38. A bracket 64 which is made of plastic is used for connecting the cover 58 to the body of the vehicle. The reason why such plastic bracket is employed in this case will become clear later. Between the stub shaft 54 and the cylindrical portion 62 of the box shaped cover 58 is engaged a third ball bearing 66 which has inner and outer races (no numerals) firmly connected to the stub shaft 54 and the cover 58, respectively. Preferably, the connections between the third ball bearing 66 and the stub shaft 54, and between the third ball bearing 66 and the tubular cover 58 may be made by welding. For the purpose of obtaining a balanced operation of the shock absorbing device 10, the safety steering system 36 in this case is equipped with two shock absorbing devices 10. Each of the devices 10 is arranged between the square cross section portion 60 of the cover 58 and the outside portion of the outer casing 38 and comprises elongate or rod members 68 which are spaced from each other and firmly connected at their both ends to the outer housing 38, and a strap 70 which alternately passed through the clearances defined between the rod members 68 and is firmly fastened at its one end to the tubular cover 58.

In a collision of the vehicle, the impact shock applied to the steering wheel 56 by the vehicle driver causes destruction of the plastic bracket 64. Then, the plastically deformable straps 70 are driven away from the rod members 68 connected to the outer housing 38 due to the forward movement of the cover 58. During the forward movement of the straps 70, the straps are successively plastically deformed in a manner mentioned before, so as to absorb the impact shock. Consequently, the vehicle driver is safe under such collision.

Although, in the previous description, only one strap is passed over the rod members in each of the shock absorbing devices, it is also possible to use a piled strap member consisting of at least two straps overlapping each other for each of the devices. In this case, there will also be generated sliding friction at the contacting surfaces of the two straps during the extracting movement of the strap member from the rod members. This sliding friction is also useful for damping the impact shock.

What is claimed is:

1. In combination a steering system and an impact absorbing means for use therewith for a motor vehicle having a body, comprising a first casing securely connected to said body and having an end portion which has substantially uniform cross section throughout; a tubular shaft rotatably received in said first casing and having first and second ends, said first end being coupled through a steering linkage to steered road wheels of said vehicle; a stub shaft having a first end in splined connection with said second end of said tubular shaft to permit telescopic movement therebetween while causing rotation of said tubular shaft when said stub shaft is rotated, and a second end fixedly connected to a steering wheel to be rotatable therewith; a second casing spacedly mounted about said stub shaft and having an end portion thereof which has substantially uniform cross section throughout and receives therein said end portion of said first casing, said second casing being supported by said body by means of an easily breakable bracket which permits the rotation of said stub shaft therein and to telescopically receive said first casing therein on being urged toward said first casing by a force applied to said steering wheel; a plurality of spaced elongate members arranged parallel to each other and fixedly connected at their ends to the outer surface of said end portion of said first casing so as to be perpendicular to the axis of said tubular shaft; and a strap member made of a plastically deformable material having one end thereof fixedly connected to the end portion of said second casing most remote from said steering wheel and being interlaced through said elongate members so as to be subjected to successive plastic deformation when said second casing is driven toward said first casing by a force applied to said steering wheel.

2. In combination a steering system and an impact absorbing means for use therewith for a motor vehicle having a body, comprising a first casing having uniform cross section throughout and securely connected to said body; a tubular shaft spacedly received in said first casing and having first and second ends, said first end being coupled through a steering linkage to steered road wheels of said vehicle; ball-bearings disposed in said first casing to support said tubular shaft thereby allowing rotation of said tubular shaft relative to said first casing; a stub shaft having first and second ends, said first end being in splined connection with said second end of said tubular shaft to permit telescopic movement therebetween and to cause rotation of of said tubular shaft when said stub shaft is rotated, said second end of said stub shaft being fixedly connected to a steering wheel to be rotatable therewith; a second casing spacedly mounted about said stub shaft and having an end portion thereof which has substantially uniform cross section throughout and telescopically receives therein an end portion of said first casing, said second casing being connected to said body of said vehicle through a bracket made of a plastic material; a ball-bearing disposed in said second casing to support said stub shaft to permit rotation of said stub shaft relative to said second casing; two shock absorbing devices located at diametrically opposite positions with respect to said tubular shaft, each of said shock absorbing devices comprising a plurality of spaced elongate members arranged parallel to each other and fixedly connected to the outer surface of said end portion of said first casing so as to be perpendicular to the axis of said tubular shaft, and a strap member made of a plastically deformable material having one end thereof fixedly connected to the end portion of said second casing most remote from said steering wheel and being interlaced through said elongate members so as to be subjected to successive plastic deformation when said second casing is driven toward said first casing by a force applied to said steering wheel.

* * * * *